United States Patent
Ng et al.

(10) Patent No.: US 11,258,364 B2
(45) Date of Patent: Feb. 22, 2022

(54) FLEXIBLE ARRAY OF DC-DC CONVERTERS RECONFIGURABLE USING A SHARED SERIAL BUS

(71) Applicant: High Tech Technology Limited, Hong Kong (HK)

(72) Inventors: Chik Wai (David) Ng, Hong Kong (HK); Kit Wing (Simon) Lee, Hong Kong (HK); Sheung Wai (Orange) Fung, Hong Kong (HK); Ka Lok (Roy) Ng, Hong Kong (HK)

(73) Assignee: High Tech Technology Limited, Hong Kong (HK)

( * ) Notice: Subject to any disclaimer, the term of this patent is extended or adjusted under 35 U.S.C. 154(b) by 69 days.

(21) Appl. No.: 16/844,104

(22) Filed: Apr. 9, 2020

(65) Prior Publication Data
US 2021/0320590 A1    Oct. 14, 2021

(51) Int. Cl.
*H02M 3/158*    (2006.01)
*H02M 1/088*    (2006.01)
*H02M 3/157*    (2006.01)
*H02M 1/00*     (2006.01)

(52) U.S. Cl.
CPC ......... *H02M 3/1584* (2013.01); *H02M 1/088* (2013.01); *H02M 3/157* (2013.01); *H02M 1/0009* (2021.05)

(58) Field of Classification Search
None
See application file for complete search history.

(56) References Cited

U.S. PATENT DOCUMENTS

| | | |
|---|---|---|
| 7,084,611 B2 | 8/2006 | Kirchner et al. |
| 8,780,590 B2 | 7/2014 | So et al. |
| 2015/0023076 A1* | 1/2015 | Nakamori ............... H02M 1/32 363/56.03 |

(Continued)

OTHER PUBLICATIONS

ON Semiconductor, "NCP81239, NCP81239A USB Power Delivery 4-Switch Buck Boost Controller", Pub. No. NCP81239/D, pp. 1-25, Jan. 2019.

(Continued)

*Primary Examiner* — Jeffrey A Gblende
(74) *Attorney, Agent, or Firm* — Stuart T. Auvinen; gPatent LLC

(57) ABSTRACT

A re-configurable bank of DC-DC converters has many channels, each with a DC-DC converter and a controller that senses the channel's output voltage and current to adjust a duty cycle of switch signals to the DC-DC converter. A serial bus connects to all controllers and writes digital voltage and current control targets into each controller. The controller has Digital-to-Analog Converters (DACs) that convert the targets to analog voltages that are compared to sensed output voltage and current. The comparison results are compared to a sawtooth wave to generate pulses of the switch signals that have a duty cycle adjusted for the target comparisons. In combined mode, a primary channel's controller generates switch signals for secondary channels having outputs shorted to the primary channel. Secondary channels have a mux to select switch signals from the primary controller during combined mode, and from the secondary controller during separated mode.

20 Claims, 11 Drawing Sheets

(56) References Cited

U.S. PATENT DOCUMENTS

| | | | |
|---|---|---|---|
| 2015/0188427 A1* | 7/2015 | Yorozu | H02M 3/1584 |
| | | | 323/271 |
| 2018/0041117 A1 | 2/2018 | Junyong | |
| 2018/0337599 A1* | 11/2018 | Chen | H02M 3/158 |
| 2019/0334480 A1* | 10/2019 | Nomiyama | H03F 3/183 |

OTHER PUBLICATIONS

ON Semiconductor, "Product Overview—NCP81239: 4-Switch Buck Boost Controller, USB Power Delivery and Type-C Applications", Apr. 2, 2020.

* cited by examiner

SEPARATED MODE

BUCK, N:1 COMBINED MODE

BUCK-BOOST, COMBINED MODE

FLEXIBLE ARRAY OF DC-DC CONVERTERS RECONFIGURABLE USING A SHARED SERIAL BUS

FIELD OF THE INVENTION

This invention relates to DC-DC power converters, and more particularly to digital control and configuration of multiple channels of DC-DC converters.

BACKGROUND OF THE INVENTION

Power converters are widely used to provide stable supply voltages to various electronic systems. DC-DC power converters receive an input voltage from an input node that is able to deliver a large current and output a regulated output voltage. Both input and output voltages are Direct Current (DC).

Oftentimes DC-DC converters are separately controlled, even when the DC-DC converters are part of a bank of DC-DC converters, sometimes even on the same Integrated Circuit (IC) chip. Each DC-DC converter drives a different output node, and each DC-DC converter has its own control.

Some applications require a higher power be delivered. It would be desirable to have two or more DC-DC converters drive the same output node. However, the controllers in each of the DC-DC converters typically act independently of each other. This separated control can lead to various problems, such as current hogging and instability as one DC-DC converter's controller over-corrects and eventually that DC-DC converter ends up supplying most of the current, rather than having the two DC-DC converters share the current load evenly.

Various types of DC-DC converters are commonly used, such as Buck, Boost, and Buck-Boost. Each type of converter is useful for certain kinds of applications. It is desirable to have a generic DC-DC converter that can be configured for any of these kinds of DC-DC converters, including Buck, Boost, and Buck-Boost.

What is desired is a bank of DC-DC converters that are each digitally controlled by a shared bus. It is desired to re-configure the DC-DC converters so that each DC-DC converter drives a separate output node, where the DC-DC converters are configured for a separated mode, and for having two or more DC-DC converters drive the same output node, in a combined mode. It is further desired to prevent separated control problems when two or more DC-DC converters are configured to drive the same output node.

DETAILED DESCRIPTION

The present invention relates to an improvement in DC-DC converters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
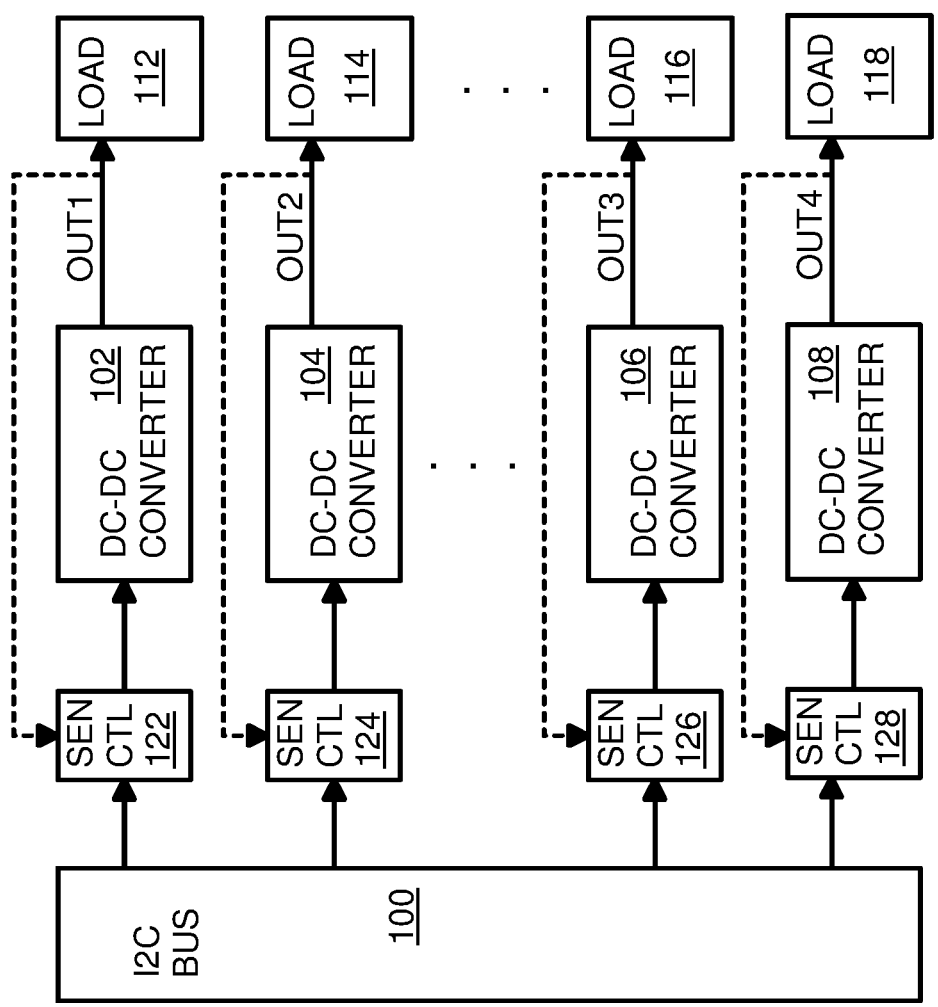
FIG. 1 is a block diagram of a digitally-controlled re-configurable bank of DC-DC converters operating in a separated channel mode.

FIG. 1 is a block diagram of a digitally-controlled re-configurable bank of DC-DC converters operating in a separated channel mode. I2C bus 100 is an Inter-IC bus or other bus such as a Universal Asynchronous Receiver Transmitter (UART) bus, a Serial Peripheral Interface (SPI) bus, or other software-controlled bus. I2C bus 100 is controlled by software running on a host (not shown), which sends data and commands over I2C bus 100 to controllers 122, 124, . . . 126, 128.

Each of the four channels shown is similar to the first channel, which has controller 122 that receives digital values of current and voltage control targets from I2C bus 100. Controller 122 has sensors that sense the output voltage and the output current delivered to load 112 over output node OUT1. When the output voltage falls below the voltage control target, or when the output current falls below the current control target, controller 122 causes DC-DC converter 102 to increase current delivered to output OUT1.

Likewise, in the second channel, when the output voltage of OUT2 rises above the voltage control target programmed into controller 124, or when the output current to OUT2 rises above the current control target programmed into controller 124, then controller 124 causes DC-DC converter 104 to decrease current delivered to load 114 by output OUT2.

Each of DC-DC converters 102, 104, . . . 106, 108 can be separately controlled by its own controller 122, 124, . . . 126, 128 to drive a different load 112, 114, . . . 116, 118. Although there are separate channels, a shared bus, I2C bus 100, connects to all controllers 122, 124, . . . 126, 128.

Figure 2:
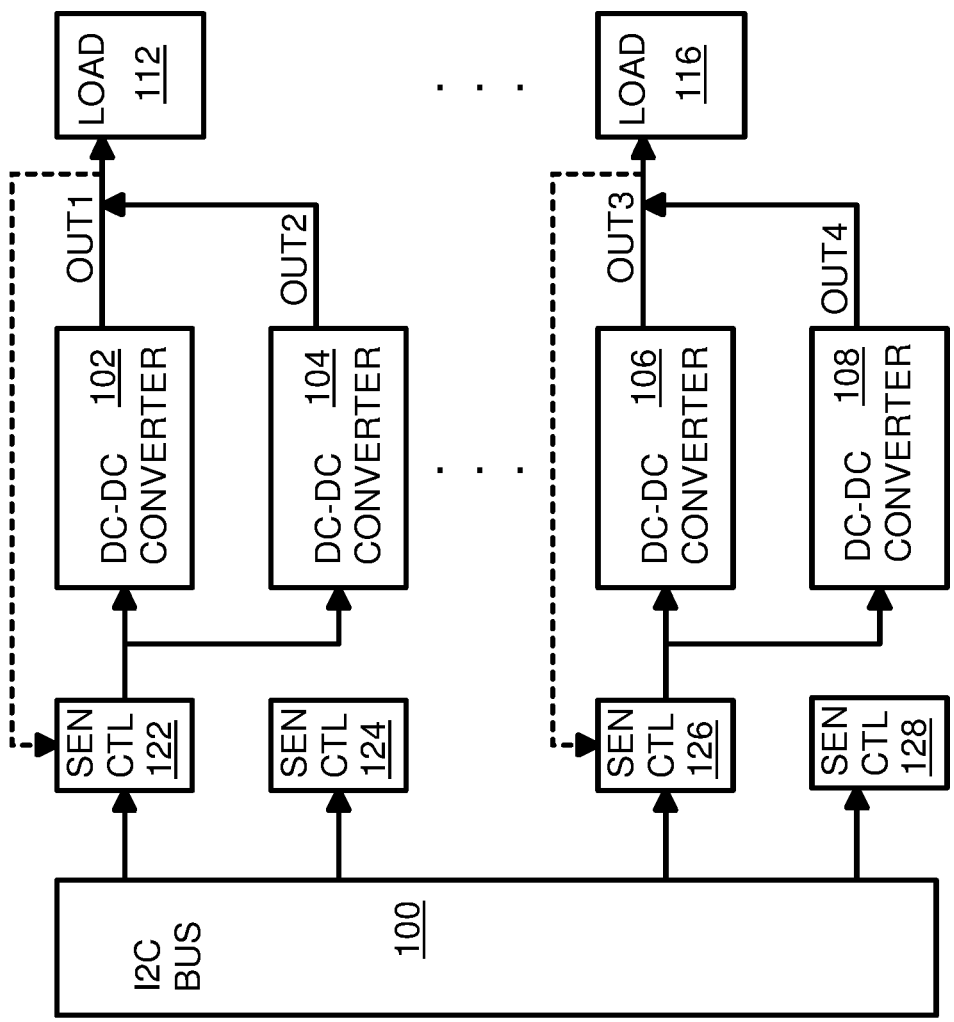
FIG. 2 is a block diagram of the digitally-controlled re-configurable bank of DC-DC converters operating in a combined mode.

FIG. 2 is a block diagram of the digitally-controlled re-configurable bank of DC-DC converters operating in a combined mode. In combined mode, the host sends commands over I2C bus 100 to disable controllers 124, 128.

The host uses I2C bus 100 to program first controller 122 with the digital values of the current and voltage control targets. Controller 122 has sensors that sense the output voltage and the output current delivered to load 112 over output node OUT1.

To double the current supplied, OUT2 is connected to OUT1, so that both first DC-DC converter 102 and second DC-DC converter 104 are driving the same output node. Both DC-DC converters 102, 104 drive load 112. Second controller 124 is disabled, while first controller 122 controls both first DC-DC converter 102 and second DC-DC converter 104.

When the output voltage on OUT1 falls below the voltage control target, or when the output current falls below the current control target, first controller 122 causes first DC-DC converter 102 and second DC-DC converter 104 to increase current delivered to output OUT1. Likewise, when the output voltage on OUT1 rises above the voltage control target programmed into first controller 122, or when the output current rises above the current control target, first controller 122 causes first DC-DC converter 102 and second DC-DC converter 104 to decrease current delivered to output OUT1.

Load-balancing control problems are avoided since there is only 1 controller, first controller 122, which senses the output and controls both of DC-DC converters 102, 104. Since there is a single point of sensing, and a single point of control, there is no possibility of fighting among two separate controllers and DC-DC converters.

In combined mode, controller 126 senses OUT3, which is shorted to OUT4 to drive load 116. Controller 128 is disabled while controller 126 controls both of DC-DC converters 106, 108. When DC-DC converters 106, 108 have the same drive capability, controller 126 adjusts the currents in DC-DC converters 106, 108 by an equal amount. Thus the load is balanced between DC-DC converters 106, 108.

Figure 3:
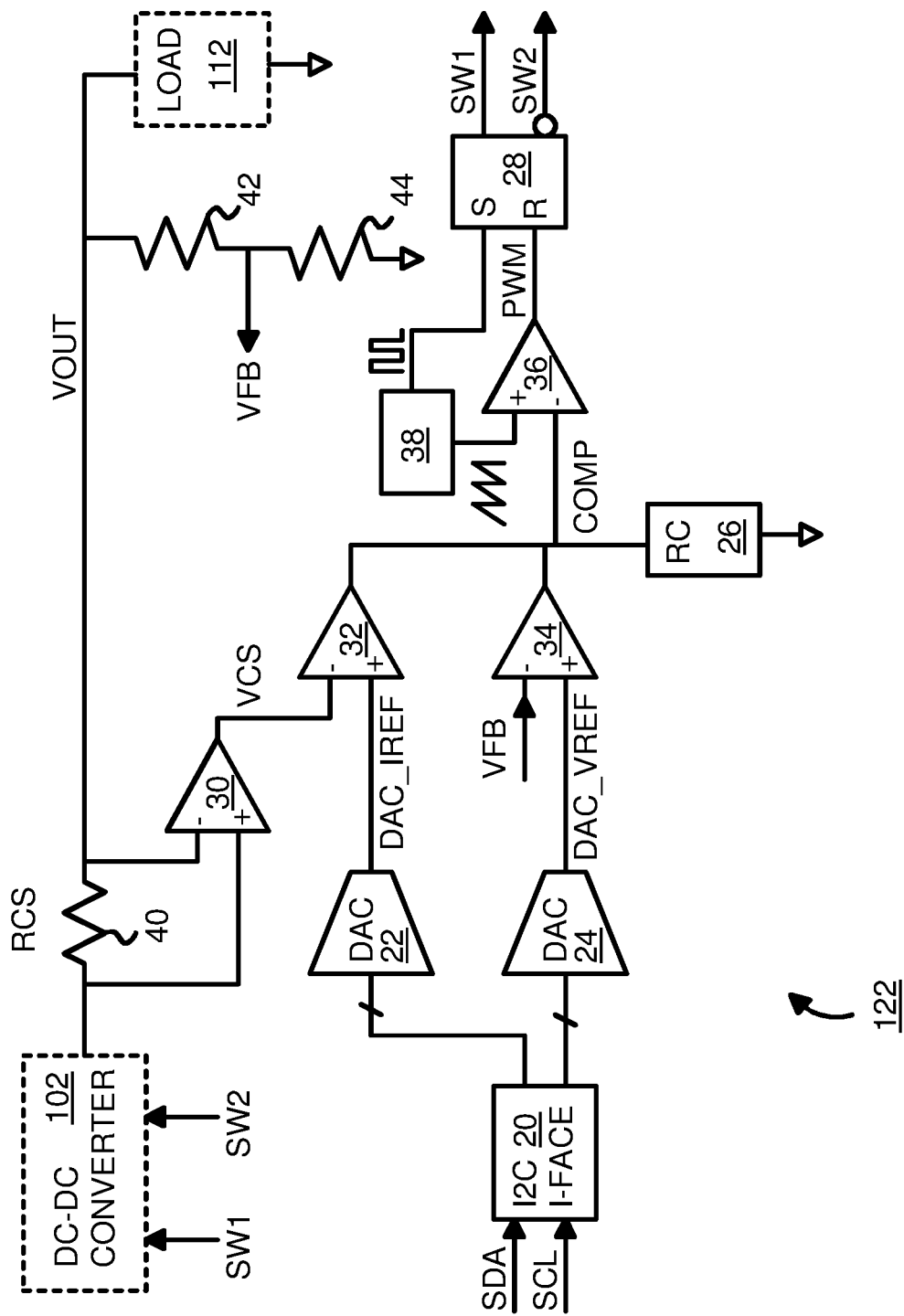
FIG. 3 shows the controller in more detail.

FIG. 3 shows the controller in more detail. Controller 122 can be programmed by I2C bus 100, which contains a Serial DAta line SDA, and a Serial CLock line SCL. Serial data on SDA from I2C bus 100 is clocked by SCL into I2C interface 20, shown in detail later in FIG. 11. When an address or device number matches that assigned to controller 122, this serial data is buffered and any commands executed. These commands may include writing the voltage control target and the current control target into local registers.

The voltage control target register in I2C interface 20 drives a multi-bit digital value to Digital-to-Analog Converter (DAC) 22 that generates an analog voltage DAC_IREF, which is the voltage equivalent of the current control target. Likewise, the current control target register in I2C interface 20 drives a multi-bit digital value to DAC 24 that generates an analog voltage DAC_VREF, which is the analog equivalent of the voltage control target. Thus software running on a host can program the current control target and voltage control target in controller 122 to generate analog reference voltages DAC_IREF and DAC_VREF.

Controller 122 performs sensing by comparing the voltages on both sides of current-sensing resistor 40, which is in series between DC-DC converter 102 and load 112 on VOUT. Current-sensing resistor 40 can have a very small resistance value to reduce losses. Amplifier 30 amplifies this voltage difference across current-sensing resistor 40 to generate current-sense voltage VCS that rises with the output current to VOUT. Amplifier 30 compares current-sense voltage VCS to the current control target voltage DAC_IREF and drives its output COMP lower when VCS rises above DAC_IREF.

The lower COMP voltage discharges RC filter 26, which can be a capacitor with a resistor or can be a capacitor with parasitic resistance. The lower COMP voltage is compared by comparator 36 to a sawtooth wave generated by waveform generator 38. When the peaks of the sawtooth wave rise above COMP, comparator 36 drives its output PWM high to reset SR latch 28. When the square pulses that are also generated by waveform generator 38 goes from low to high, it sets SR latch 28.

SR latch 28 is set to generate SW1 high and SW2 low at the start of the clock period, when the clock rises at the set input of SR latch 28. SR latch 28 is reset and generates SW2 high and SW1 low when PWM goes high by the sawtooth wave rising above COMP. SW1 is a switch control signal applied to DC-DC converter 102 that causes current to be switched onto output OUT, while SW2 is a switch control signal applied to DC-DC converter 102 that causes current to be shunted to ground from output OUT. Thus the duty cycle increases as COMP rises, since SR latch 28 is reset later by comparison with the rising sawtooth wave within the period of the square pulses. The square pulses and the sawtooth waves can be synched to each other, having the same period and phase. Increasing the duty cycle increases the time that DC-DC converter 102 drives current to output OUT1.

As COMP rises, the time before SR latch 28 is reset is increased, thus increasing the duty cycle and output current and voltage. Alternately, lower COMP voltages produce lower duty cycles and less output current and lower output voltage.

Voltage divider resistors 42, 44 divide the output voltage on output OUT to generate feedback voltage VFB. VFB is compared by amplifier 34 to the voltage control target DAC_VREF to drive COMP lower when VFB rises above DAC_VREF, and drive COMP higher when VFB falls below DAC_VREF.

A voltage feedback loop controls the output voltage. When VOUT rises, VFB also rises, and when VFB rises above the target DAC_VREF, then COMP is driven lower by amplifier 34. PWM is high for a shorter time per cycle, and SW1 has a lower duty cycle. The lower duty cycle of SW1 reduces the current drive from DC-DC converter 102 to VOUT. This lower output current corrects for the high VOUT, which falls as a lower output current flows through the resistances in load 112. Load 112 can be modeled as a capacitor and a resistor in parallel between VOUT and ground.

A current feedback loop also exists. When the output current from DC-DC converter 102 rises, the current through current-sensing resistor 40 rises as does the voltage drop across current-sensing resistor 40, which is measured by amplifier 30, increasing VCS. When VCS rises above the current control target voltage DAC_IREF, then COMP is driven lower through amplifier 32. PWM is low for a smaller time per cycle, so SW1 has a lower duty cycle. The lower duty cycle of SW1 reduces the current drive from DC-DC converter 102 to VOUT. This lower output current corrects for the higher current, so the current through current-sensing resistor 40 falls as a lower output current flows through the resistances in load 112.

Both the voltage control target, through DAC_VREF and amplifier 34, and the current control target, through DAC_IREF and amplifier 32, are used to adjust COMP. The outputs of both amplifiers 32, 34 are connected together, and the combined output current charges and discharges RC filter 26 to adjust voltage COMP. Thus the voltage on COMP is a combination of current and voltage control. DC-DC converter 102 is both current and voltage regulated.

The host software can adjust the targets in controller 122 for better regulation of the particular load 112. The voltage control target and current control target can be adjusted together to optimize the converter efficiency according to the load. The software can also impose an output power limit of the converter. Either the current control or the voltage control can be disabled to achieve a pure constant voltage converter or constant current converter.

Figure 4:
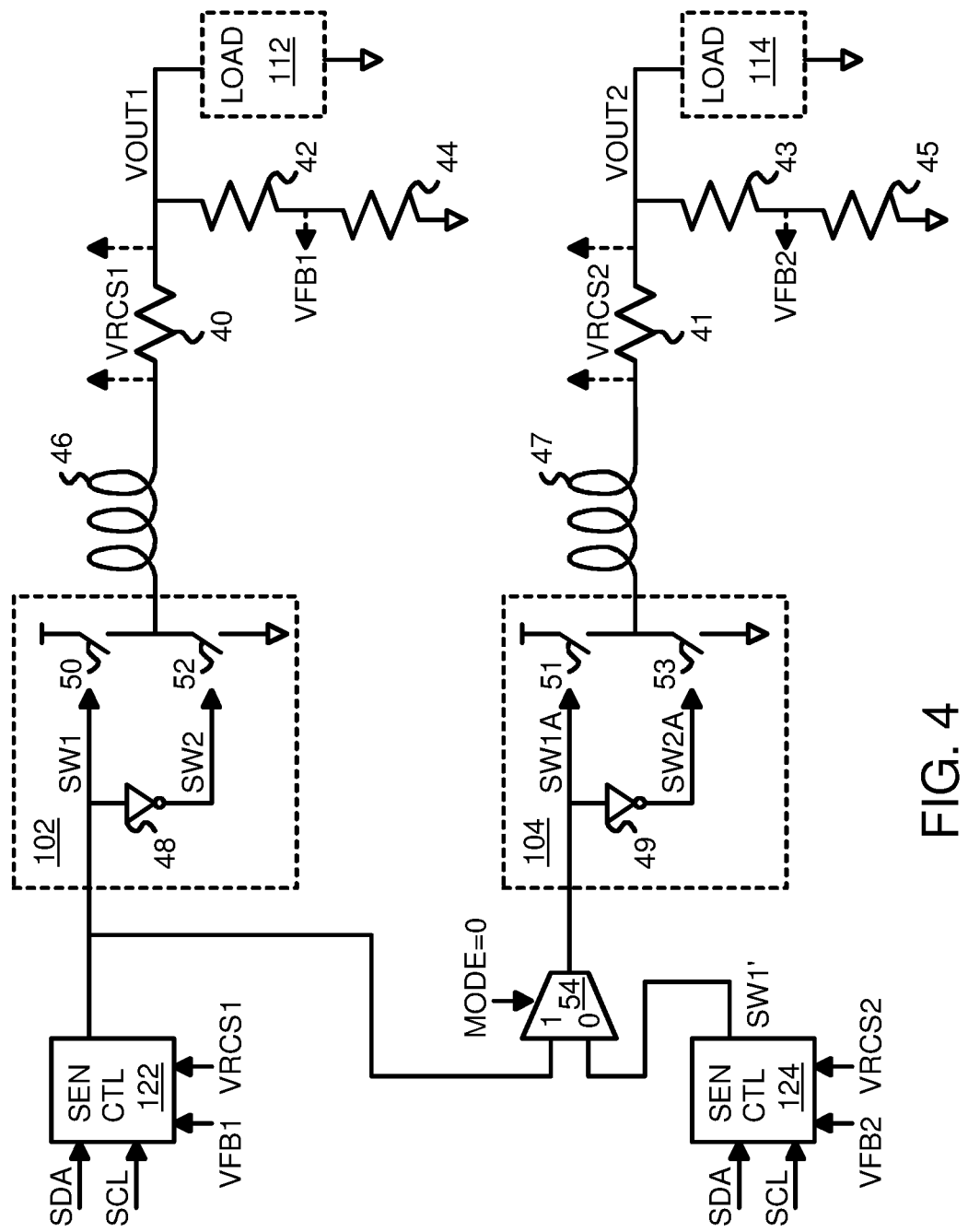
FIG. 4 shows the digitally-controlled re-configurable bank of DC-DC converters operating in a separated mode as Buck converters.

FIG. 4 shows the digitally-controlled re-configurable bank of DC-DC converters operating in a separated mode as Buck converters. Only the first pair of DC-DC converters 102, 104 is shown, but there may be other pairs integrated together onto a single IC.

First controller 122 is programmed by SDA, SCL from I2C bus 100 to store the current control target and the voltage control target. The current control target is compared to the output current through current-sensing resistor 40 that is sensed as voltage VRCS1. The voltage control target is compared to the feedback voltage VFB1 generated by voltage divider resistors 42, 44 from first output voltage VOUT1.

Both of the comparison results are used to adjust the duty cycle of SW1. SW1 is inverted by inverter 48 to generate SW2 in DC-DC converter 102.

When SW1 is high and SW2 is low, transistor 50 closes and transistor 52 opens to drive current from an input voltage or power supply to output VOUT1 through inductor 46 and current-sensing resistor 40. When SW1 is low and SW2 is high, transistor 50 is open and transistor 52 is closed to reduce the current flow through inductor 46, which resists instantaneous changes in current flow.

Second DC-DC converter 104 operates in a similar manner to drive current through inductor 47 and through current-sensing resistor 41 to generate VRCS2 that is compared to the current control target written into second controller 124. This second output current charges or powers load 114 to generate VOUT2, which is divided by voltage divider resistors 43, 45 to generate VFB2. VFB2 is compared to the voltage control target written into second controller 124 to adjust the duty cycle of SW1'.

Rather than directly connect to second DC-DC converter 104, second controller 124 outputs SW1'. During separated mode, mode signal MODE is low, which causes mux 54 to select SW1' from second controller 124 to drive the local SW1 signal in second DC-DC converter 104, SW1A. SW1A high closes transistor 51 to drive current to inductor 47, while SW1A low is inverted by inverter 49 to drive SW2A high, which turns on transistor 53 to reduce current through inductor 47.

A Buck converter is one kind of a switching mode power converter for reducing a high-level DC voltage to a low-level DC voltage with excellent efficiency using switches, inductors, and capacitors. By varying the duty cycle, a lower desired output voltage can be obtained from the input voltage. Buck converters have been used extensively in point-of-load converters, battery chargers, motor drivers, etc.

Figure 5:
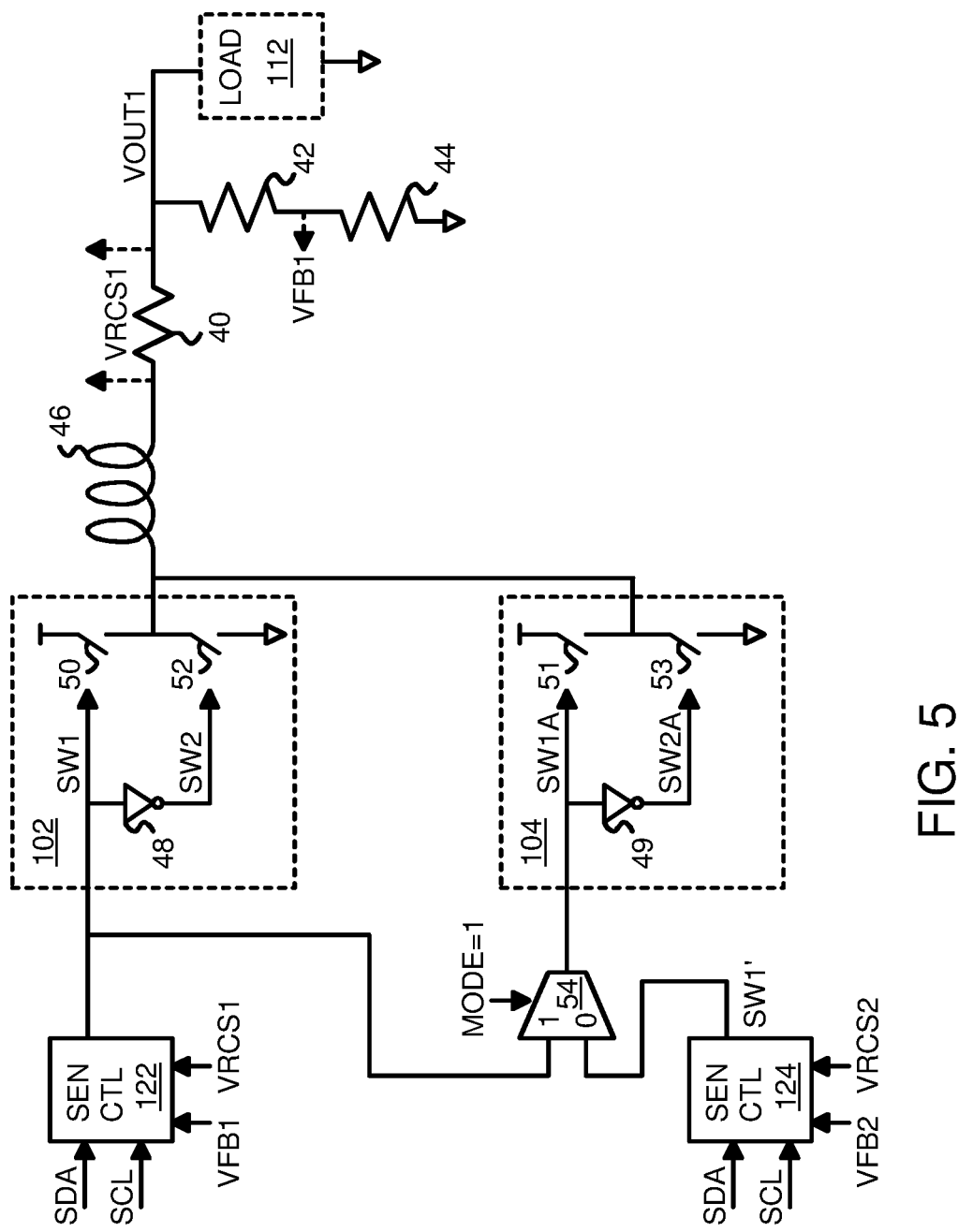
FIG. 5 shows the digitally-controlled re-configurable bank of DC-DC converters operating in a combined mode as Buck converters.

FIG. 5 shows the digitally-controlled re-configurable bank of DC-DC converters operating in a combined mode as Buck converters. Only the first pair of DC-DC converters 102, 104 is shown, but there may be other pairs integrated together onto a single IC.

In combined mode, there is only one load 112 that is driven by both DC-DC converters 102, 104. Combined mode doubles the available power and current to first output and load 112.

First controller 122 operates as described for FIG. 4, comparing VRCS1 from current-sensing resistor 40 to the current control target, and comparing VFB1 generated by voltage divider resistors 42, 44 to the voltage control target, to adjust the duty cycle of SW1.

Second controller 124 is disabled by the I2C bus through command sequences sent using SDA, SCL. The I2C bus also sets the mode signal MODE to 1. Mux 54 selects SW1 from first controller 122, rather than SW1' from second controller 124, when MODE is 1, signaling combined mode rather than separated mode. SW1 from first controller 122 is passed through mux 54 to drive SW1A in second DC-DC converter 104.

When SW1 is high, transistor 50 in first DC-DC converter 102, and transistor 51 in second DC-DC converter 104, are both turned on, and both drive current to inductor 46. The outputs of both DC-DC converters 102, 104 are shorted together and to inductor 46 in combined mode. Inductor 46 can be external to the IC having DC-DC converters 102, 104 and controllers 122, 124. DC-DC converters 102, 104 can have separate output pins on this IC, which are connected together external to the IC and to inductor 46.

When SW1 is low, transistor 52 in first DC-DC converter 102, and transistor 53 in second DC-DC converter 104, are both turned on, and both reduce current to inductor 46. When transistors 50, 51 have the same size, and transistors 52, 53 have the same size, then the current drives of DC-DC converters 102, 104 are the same, and the overall current drive to the combined output is doubled. The size of external components, such as inductor 46, current-sensing resistor 40, voltage divider resistors 42, 44, can be adjusted for the doubled current.

Figure 6:
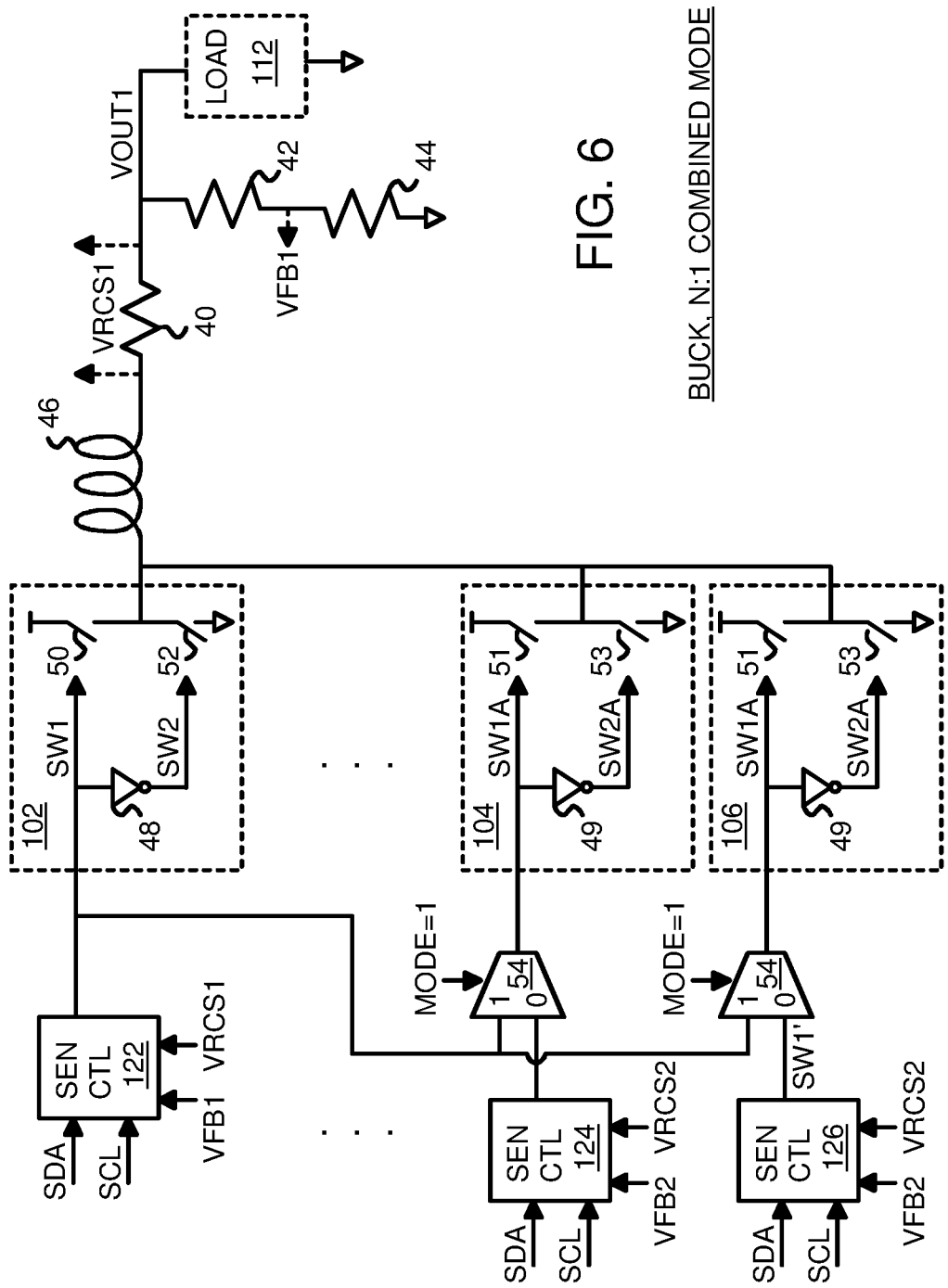
FIG. 6 shows the digitally-controlled re-configurable bank of DC-DC converters operating in a N:1 combined mode as Buck converters.

FIG. 6 shows the digitally-controlled re-configurable bank of DC-DC converters operating in a N:1 combined mode as Buck converters. Only the first several of DC-DC converters 102, 104, 106 are shown, but there may be other groups of DC-DC converters integrated together onto a single IC.

In N:1 combined mode, there is only one load 112 that is driven by all DC-DC converters 102, 104, 106. Combined mode multiplies the available power and current by N to first output and load 112. N is the number of DC-DC converters that are ganged together to drive the same output.

First controller 122 operates as described for FIGS. 4-5, comparing VRCS1 from current-sensing resistor 40 to the current control target, and comparing VFB1 generated by voltage divider resistors 42, 44 to the voltage control target, to adjust the duty cycle of SW1.

Rather than have just one additional DC-DC converter 104 that also drives current through inductor 46, as shown in FIG. 5, there are N−1 additional DC-DC converters . . . 104, 106, each having transistor 51 for driving supply current to inductor 46, and each having transistor 53 that shunts current to ground to reduce the current through inductor 46. Each DC-DC converter . . . 104, 106 has a local inverter 49 for generating SW2A from SW1A.

Each of the additional DC-DC converters . . . 104, 106 has its controller . . . 124, 126 disabled by commands from the I2C bus. The SW1' switch control signal from the disabled controllers . . . 124, 126 are blocked by muxes 54, since the mode control MODE is set to 1 for combined mode. Each of muxes 54 selects SW1 generated from first controller 122 to drive the SW1A signal to DC-DC converters . . . 104, 106.

Figure 7:
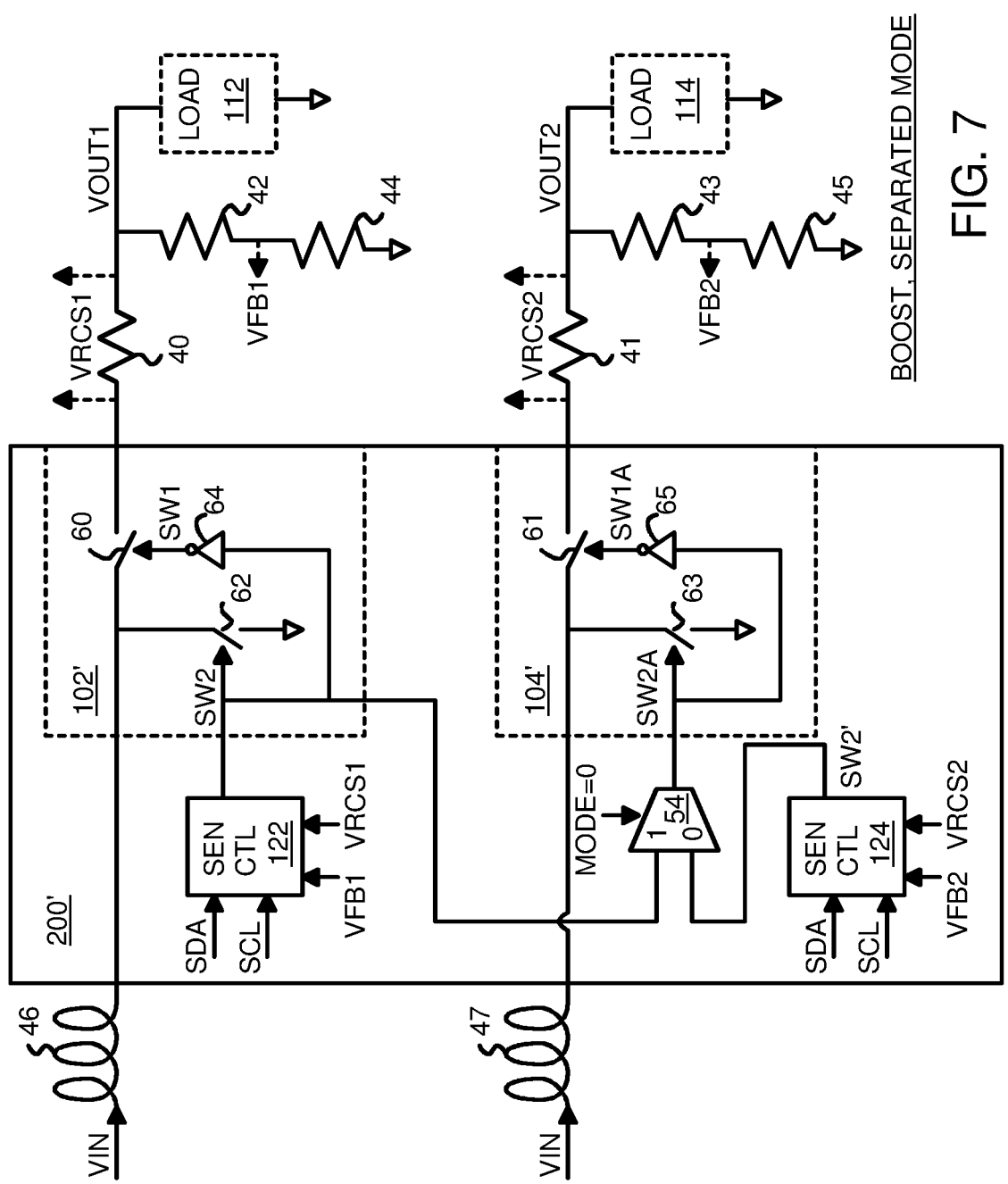
FIG. 7 shows the digitally-controlled re-configurable bank of DC-DC converters operating in a separated mode as Boost converters.

FIG. 7 shows the digitally-controlled re-configurable bank of DC-DC converters operating in a separated mode as Boost converters. Only the first pair of DC-DC converters 102', 104' is shown, but there may be other pairs integrated together onto a single IC.

IC 200' integrates DC-DC converters 102', 104', . . . and controllers 122, 124, . . . onto the same silicon or other semiconductor or other substrate.

First controller 122 is programmed by SDA, SCL from the I2C bus to store the current control target and the voltage control target. The current control target is compared to the output current through current-sensing resistor 40 that is sensed as voltage VRCS1. The voltage control target is compared to the feedback voltage VFB1 generated by voltage divider resistors 42, 44 from first output voltage VOUT1.

Both of the comparison results are used to adjust the duty cycle of SW1 and its inverse SW2. Rather than take SW1 from SR latch 28, its inverse, SW2 is taken and output by controller 122. SW2 is inverted by inverter 64 to generate SW1 in DC-DC converter 102'.

When SW1 is low and SW2 is high, transistor 60 is open and transistor 62 is closed. The input voltage is shorted to ground through inductor 46, which resists instantaneous changes in current flow and makes the current ramp up relatively slowly. A magnetic field builds up around inductor 46, and the energy is stored in the inductor. When SW1 is high, transistor 60 closes and transistor 62 opens to drive current from input voltage VIN through inductor 46 to output VOUT1 through current-sensing resistor 40. Thus, the inductor current charges the output voltage from the input voltage to boost the output voltage above VIN.

Second DC-DC converter 104' operates in a similar manner to pull current through inductor 47 and transistor 61 and then through current-sensing resistor 41 to generate VRCS2 that is compared to the current control target written into second controller 124. This second output current charges or powers load 114 to generate VOUT2, which is divided by voltage divider resistors 43, 45 to generate VFB2. VFB2 is compared to the voltage control target written into second controller 124 to adjust the duty cycle of SW1' and its inverse SW2'. Second controller 124 outputs SW2'.

During separated mode, mode signal MODE is low, which causes mux 54 to select SW2' from second controller 124 to drive the local SW2 signal in second DC-DC converter 104', SW2A. SW2A high turns on transistor 63 to shunt current from inductor 47 to ground, storing energy in the inductor. SW2A low is inverted by inverter 65 to drive SW1A high, which closes transistor 61. Then the input current from VIN can flow through inductor 47 and through transistor 61 to current-sensing resistor 41 and the second output VOUT2 to power load 114.

A Boost converter is one kind of a switching-mode power converter for increasing a low-level DC voltage to a high-level DC voltage with excellent efficiency using switches, inductors, and capacitors. By varying the duty cycle, a higher desired output voltage can be obtained from the input voltage. Boost converters have been used extensively in point-of-load converters, solar chargers, LED backlight, etc.

Figure 8:
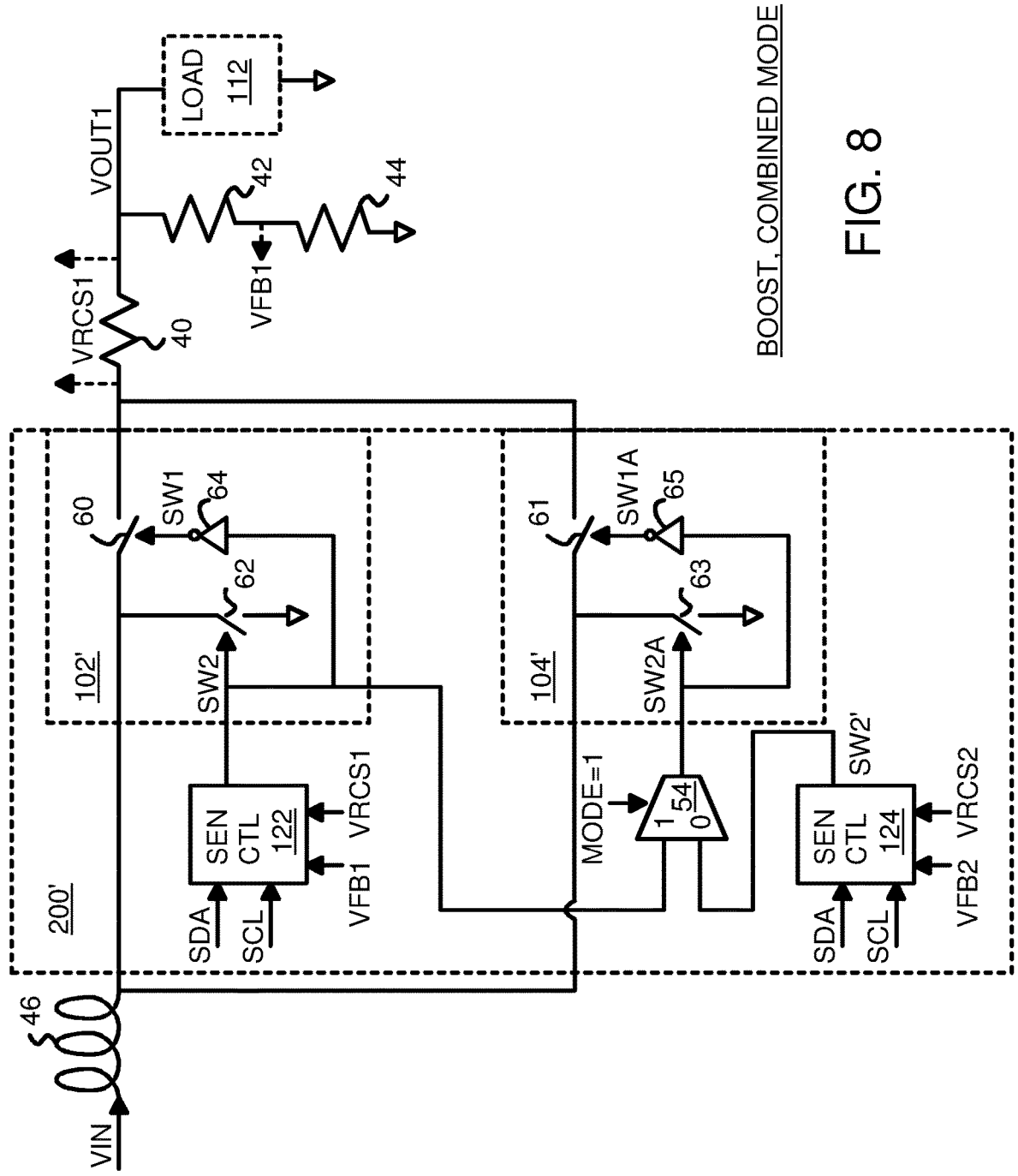
FIG. 8 shows the digitally-controlled re-configurable bank of DC-DC converters operating in a combined mode as Boost converters.

FIG. 8 shows the digitally-controlled re-configurable bank of DC-DC converters operating in a combined mode as Boost converters. Only the first pair of DC-DC converters 102', 104' is shown, but there may be other pairs integrated together onto a single IC. IC 200' integrates DC-DC converters 102', 104', . . . and controllers 122, 124, . . . onto the same silicon or other semiconductor or other substrate.

First controller 122 is programmed by SDA, SCL from the I2C bus to store the current control target and the voltage control target. The current control target is compared to the output current through current-sensing resistor 40 that is sensed as voltage VRCS1. The voltage control target is compared to the feedback voltage VFB1 generated by voltage divider resistors 42, 44 from first output voltage VOUT1.

Both of the comparison results are used to adjust the duty cycle of SW2 and its inverse SW1. Rather than take SW1 from SR latch 28, its inverse, SW2 is taken and output by controller 122. SW2 is inverted by inverter 64 to generate SW1 in DC-DC converter 102'.

When SW2 is high, transistor 62 closes to drive current from input voltage VIN through inductor 46, which stores energy, to ground. When SW2 is low and SW1 is high, transistor 60 is closed and transistor 62 is open to drive current from input voltage VIN through inductor 46 to output VOUT1 in series with current sensing resistor 40. The output voltage can be boosted above input voltage VIN.

The input of second DC-DC converter 104' is connected to the input of first DC-DC converter 102'. Also, the output of second DC-DC converter 104' is connected to the output of first DC-DC converter 102'. Thus both DC-DC converters 102', 104' share the same input and both share the same output. DC-DC converters 102', 104' are connected in parallel. This connection can be external to IC 200', so that IC 200' can be used for both separated mode (FIG. 7) and for combined mode (FIG. 8). Internal muxing (not shown) could also be used.

During combined mode, mode signal MODE is high, which causes mux 54 to select SW2 from first controller 122 to drive the local SW2 signal in second DC-DC converter 104', SW2A. SW2A high turns on transistor 63 to shunt current from inductor 46 to ground, reducing the output current. SW2A low is inverted by inverter 65 to drive SW1A high, which closes transistor 61. Then the input current from VIN can flow through inductor 46 and through both of transistors 60, 61 to current-sensing resistor 40 and the first output VOUT1 to power load 112. Second controller 124 is disabled or its output SW2' is deselected by mux 54.

When SW1 is low and SW2 is high, transistor 62 in first DC-DC converter 102', and transistor 63 in second DC-DC converter 104' are both turned on, and both shunt current from inductor 46 to ground. When transistors 60, 61 have the same size, and transistors 62, 63 have the same size, then the current drives of DC-DC converters 102', 104' are the same, and the overall current drive to the combined output is doubled. The size of external components, such as inductor 46, current-sensing resistor 40, and voltage divider resistors 42, 44, can be adjusted for the doubled current.

Figure 9:
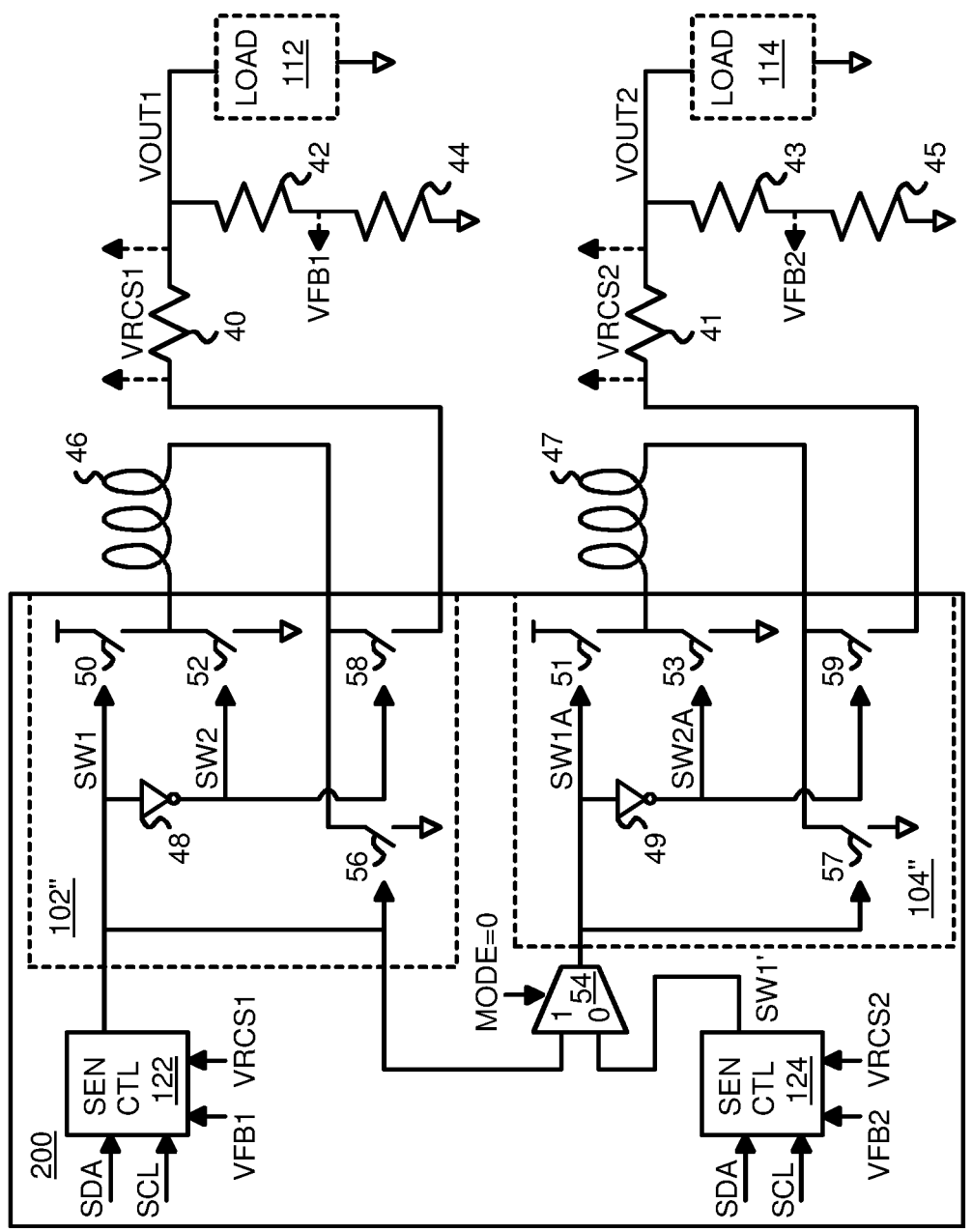
FIG. 9 shows the digitally-controlled re-configurable bank of DC-DC converters operating in a separated mode as Buck-Boost converters.

FIG. 9 shows the digitally-controlled re-configurable bank of DC-DC converters operating in a separated mode as Buck-Boost converters. Only the first pair of DC-DC converters 102", 104" is shown, but there may be other pairs integrated together onto IC 200.

First controller 122 is programmed by SDA, SCL from I2C bus 100 to store the current control target and the voltage control target. The current control target is compared to the output current through current-sensing resistor 40 that is sensed as voltage VRCS1. The voltage control target is compared to the feedback voltage VFB1 generated by voltage divider resistors 42, 44 from first output voltage VOUT1. Both of the comparison results are used to adjust the duty cycle of SW1. SW1 is inverted by inverter 48 to generate SW2 in DC-DC converter 102".

When SW1 is high, transistor 50 closes to drive current from an input voltage or power supply to output VOUT1 into inductor 46 and then to ground through transistor 56, which also receives SW1 on its gate.

When SW1 is low and SW2 is high, transistors 50, 56 are open and transistors 52, 58 are closed. Inverter 48 inverts SW1 to generate SW2 and drive the gates of transistors 52, 58. Alternately, SW2 could be taken directly from SR latch 28 in controller 122.

Since inductor 46 resists instantaneous changes in current flow, when SW1 toggles low and SW2 toggles high, current continues to flow through inductor 46, now being pulled from ground through transistor 52, and being driven through transistor 58 into current-sensing resistor 40 and to output VOUT1 to power load 112. This current has the effect of initially boosting the first output voltage VOUT1. The large capacitance of load 112 can maintain the output voltage VOUT1 over the period of SW1 when the period is small.

Second DC-DC converter 104" operates in a similar manner to switch current through inductor 47 and through current-sensing resistor 41 to generate VRCS2 that is compared to the current control target written into second controller 124. This second output current charges or powers load 114 to generate VOUT2, which is divided by voltage divider resistors 43, 45 to generate VFB2. VFB2 is compared to the voltage control target written into second controller 124 to adjust the duty cycle of SW1'.

Rather than directly connect to second DC-DC converter 104", second controller 124 outputs SW1'. During separated mode, mode signal MODE is low, which causes mux 54 to select SW1' from second controller 124 to drive the local SW1 signal in second DC-DC converter 104", SW1A. SW1A high closes transistors 51, 57 to charge inductor 47, while SW1A low is inverted by inverter 49 to drive SW2A high, which turns on transistors 53, 59 to discharge inductor 47 to drive second load 114 on second output VOUT2.

The connections to inductors 46, 47 and current-sensing resistors 40, 41 can be external to IC 200. External connections can allow IC 200 to be used for both Buck and Buck-Boost modes. Inductor 46 can be connected from the shared output of transistors 50, 52 directly to current-sensing resistor 40, and the shared output of transistors 56, 58 left unconnected, for Buck mode. Inductor 46 can be connected from the shared output of transistors 50, 52 to the shared inputs of transistors 56, 58, while the other output of transistor 58 is connected to current-sensing resistor 40 for Buck-Boost mode. Similar external connections can be made for inductor 47 and current-sensing resistor 41. Each channel has 6 external connections. For the first channel, DC-DC converter 102", there are sensing inputs VFB1, VRCS1+, VRCS1−, the shared outputs of transistors 50, 52, the shared inputs of transistors 56, 58, and the other output of transistor 58.

A Buck-boost converter is one kind of a switching-mode power converter for increasing or decreasing a DC level voltage with excellent efficiency using switches, inductors, and capacitors. By varying the duty cycle, a higher or lower output voltage can be obtained from the input voltage. Buck-boost converters have been used extensively in point-of-load converters, battery power systems, etc.

Figure 10:
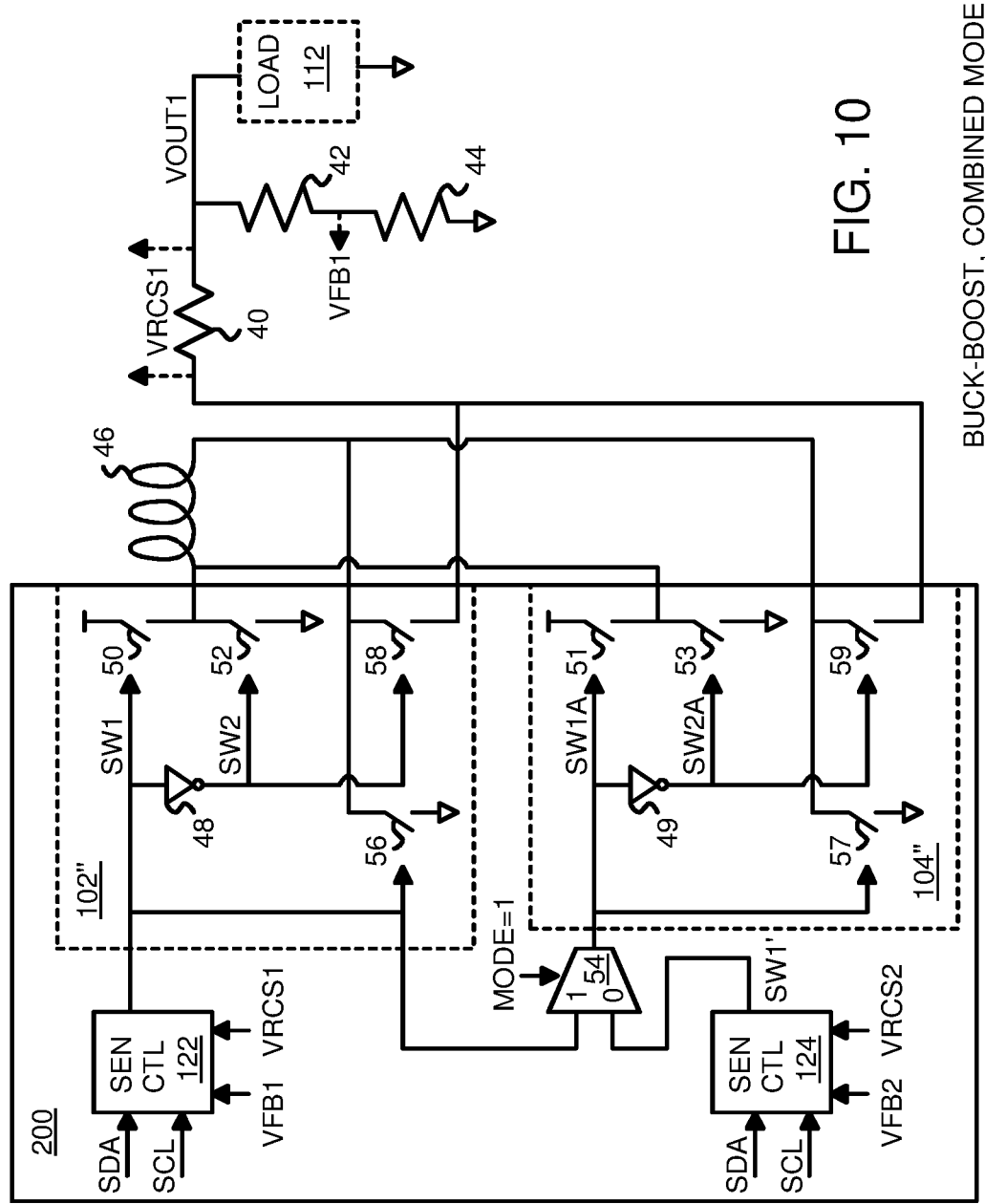
FIG. 10 shows the digitally-controlled re-configurable bank of DC-DC converters operating in a combined mode as Buck-Boost converters.

FIG. 10 shows the digitally-controlled re-configurable bank of DC-DC converters operating in a combined mode as Buck-Boost converters. Only the first pair of DC-DC converters 102", 104" is shown, but there may be other pairs integrated together onto IC 200.

In combined mode, there is only one load 112 that is driven by both DC-DC converters 102", 104". Combined mode doubles the available power and current to first output and load 112.

First controller 122 operates as described for FIG. 9, comparing VRCS1 from current-sensing resistor 40 to the current control target, and comparing VFB1 generated by voltage divider resistors 42, 44 to the voltage control target, to adjust the duty cycle of SW1.

Second controller 124 is disabled by the I2C bus through command sequences sent using SDA, SCL. The I2C bus also sets the mode signal MODE to 1. Mux 54 selects SW1 from first controller 122, rather than SW1' from second controller 124, when MODE is 1, signaling combined mode rather than separated mode. SW1 from first controller 122 is passed through mux 54 to drive SW1A in second DC-DC converter 104".

When SW1 is high, transistors 50, 56 in first DC-DC converter 102", and transistors 51, 57 in second DC-DC converter 104" are all turned on, and both transistors 50, 51 drive current to inductor 46 while transistors 56, 57 connect the far end of inductor 46 to ground. The outputs and inputs of both DC-DC converters 102", 104" are shorted together and to inductor 46 in combined mode. Inductor 46 can be external to the IC having DC-DC converters 102", 104" and controllers 122, 124. DC-DC converters 102", 104" can have separate sets of input and output pins on this IC, of which each set are connected together external to IC 200 and to inductor 46.

When SW1 is low, transistors 52, 58 in first DC-DC converter 102", and transistors 53, 59 in second DC-DC converter 104", are all turned on, with transistors 52, 53 connecting the first end of inductor 46 to ground, and transistors 58, 59 connecting the other end of inductor 46 to current-sensing resistor 40 to drive first load 112 and generate the first output voltage VOUT1.

When transistors 50, 51 have the same size, transistors 52, 53 have the same size, transistors 56, 57 have the same size, and transistors 58, 59 have the same size, then the current drives of DC-DC converters 102", 104" are the same, and the overall current drive to the combined output is doubled. The size of external components, such as inductor 46, current-sensing resistor 40, voltage divider resistors 42, 44, can be adjusted for the doubled current.

Figure 11:
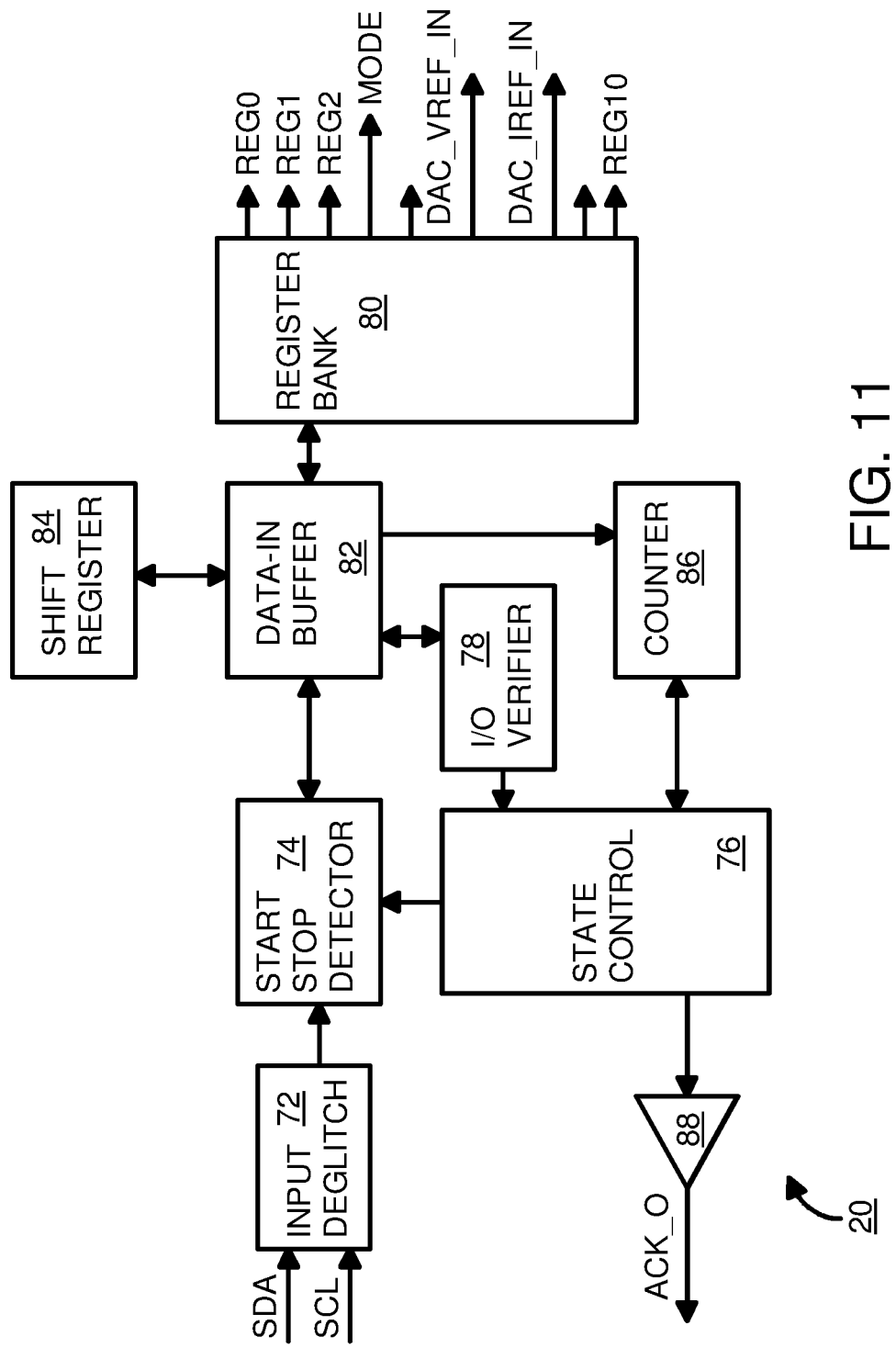
FIG. 11 is a diagram of the I2C interface.

FIG. 11 is a diagram of the I2C interface. I2C interface 20 receives the SDA data and SCL clock signals from I2C bus 100. Input deglitcher 72 removes glitches from these signals, such as by using a delay line, and the SDA data is clocked in using the SCL clock line. The data transmission rates are relatively slow for I2C. Start stop detector 74 detects the START and STOP conditions for each write. The data is stored in data-in buffer 82 and then stored in a register in register bank 80 that is identified by a register address in the data transmission.

I/O verifier 78 verifies that the data received is addressed to this particular controller, and causes state machine 76 to generate an acknowledge back to the I2C master using buffer 88 when the transmitted address matches the local controller's address. Shift register 84 and counter 86 can track and adjust the received data messages as needed for the protocols.

The data written into register bank 80 can include the current control target, which is a multi-bit digital value DAC_IREF_IN that is sent to DAC 22 (FIG. 3) that generates DAC_IREF, and the voltage control target, DAC_VREF_IN that is sent to DAC 24 (FIG. 3) that generates DAC_VREF. The mode control signal MODE that controls the select input of mux 54 may also be stored as a bit in a MODE register in register bank 80.

Alternate Embodiments

Several other embodiments are contemplated by the inventors. For example many different input and output voltages may be supported, for many different current values. The output voltage could be boosted above the input voltage, the same as the input voltage, or less than the input voltage. Other kinds of DC-DC converters could be used, such as Single-Ended Primary-Inductor Converter (SEPIC), inverted Buck-Boost, cuk converter, etc. IC 200 could have more than one kind of DC-DC converter, such as a bank of Buck converters, and another bank of SEPIC converters.

Rather than have a 2:1 mux 54 for each DC-DC converter in the N:1 combined mode example of FIG. 6, muxes with more inputs could be used. This could allow for different values of N, such as 2:1 mode, 4:1 mode, etc. Adjacent pairs of DC-DC converters could be used together for 2:1 mode, while groups of 4 adjacent DC-DC converters are used for 4:1 mode. Mux 54 could be implemented as logic gates, switches, transmission gates, transistors, wired-OR, etc.

The same IC chip could be used for multiple configurations, such as for Buck, Boost, and Buck-Boost. Two simple channels, such as a Buck channel and a Boost channel, could be combined to generate a single complex channel, such as a single complex channel that supports both Buck and Boost configurations. Different groups of channels on IC 200' could have different capabilities, such as some Buck channels and some Boost channels. Some channels could have higher-drive transistors than other channels. IC 200' of FIG. 7 integrates DC-DC converters 102, 104, . . . and controllers 122, 124, . . . onto the same silicon or other semiconductor or other substrate. Transistors could be re-arranged in a circuit by connecting their drains to output pins. While the mux select has been described as being programmable using the I2C bus, the entire chip could be set to either separated mode or to combined mode by a global register bit, or by an external pin. The external pin could be a pin that is combined with other functions, such as an extra pin that is high for combined mode and low for separated mode. This external pin could be a multifunction pin. For example, when the multifunction pin's voltage is >2V, the IC is enabled and operates in separated mode. When the multifunction pin's voltage >3V, the IC is enabled and operates in combined mode. When the multifunction pin's voltage <2V, the IC, or portion of the IC controlled by the multifunction enable pin is disabled.

Rather than have transistors 52, 53, etc. to ground, a diode to ground may be used. Similarly, other transistors could be replaced with diodes in the DC-DC converters. Transistors may be n-channel transistors, or complementary metal-oxide-semiconductor (CMOS) transistors may be used with complemented controls for the gates of p-channel transistors. Other kinds of transistors may be substituted, such as Bipolar Junction Transistor (BJT) and Insulated-Gate Bipolar transistor (IGBT). RC filter 26 may just be a capacitor, or may use parasitic resistances and capacitances. More complex filters could also be used. Amplifiers or comparators could be operational amplifiers, transconductance amplifiers, differential amplifiers, comparators, etc., or similar functions implemented by a digital circuit.

While a controller has been shown in FIG. 3, this controller may be varied in many different ways, and other kinds of controllers could be substituted, such as such as a Microcontroller Unit (MCU), Programmable Logic Controller (PLC) or Digital Signal Processor (DSP). While comparison of analog voltages has been described, the analog signals sensed from current-sensing resistor 40 and voltage divider resistors 42, 44 could be converted to digital signals and then digitally compared to digital values of current control target and voltage control target. Various filtering and signal conditioning could be performed by the controller. Delays could be added in the control loops, and changes could be smoothed out or otherwise filtered beyond that performed by RC filter 26.

The number of bits in the current control target and voltage control target could be larger for greater precision, or fewer for more coarse control. Either voltage control or current control could be disabled to allow for only current control, or only voltage control of the DC-DC converter. The MODE bit could be stored in register bank 80 for a particular controller, or could be a global bit that is stored in a separate register for all DC-DC converters on IC 200. More complex modes and configurations could be supported by IC 200. IC 200 could have dozens of DC-DC converters. Controllers could be shared by several DC-DC converters, or each DC-DC converter could have its own controller as described earlier.

While an I2C bus has been described that is shared with many controllers 122, 124, 126, . . . , other buses may be substituted, such as serial buses, Universal-Serial-Bus (USB), Universal Asynchronous Receiver Transmitter (UART) bus, Serial Peripheral Interface (SPI) bus, or other software-controlled bus. I2C bus 100 is controlled by software running on a host (not shown), which sends data and commands over I2C bus 100 to controllers 122, 124, . . . 126, 128. Various protocols and interfaces may be used. Register bank 80 may be static random-access memory (SRAM), dynamic-random-access memory (DRAM), flash memory, D-type flip-flops, random logic, or some other storage. I2C interface 20 may have fewer or additional blocks from that shown in FIG. 11. While signals SDA and SCL have been shown, other bus signals may be substituted. One particular controller 122 may be selected by an address that is decoded by each controller 122, 124, 126, 128, . . . , or may be globally decoded by a decoder on IC 200 that generates select lines that enable a particular controller 122. Other addressing and enabling schemes may be used.

Various other components may be added, such as resistors, capacitors, inductors, transistors, etc. Circuits may be powered-down or disabled by enabling transistors or switches that disconnect power or I/O. The frequency, amplitude, and slope of the sawtooth wave generated by waveform generator 38 may be adjusted or programmable, such as by one of the registers in register bank 80. This may allow greater control over the duty cycle of SW1 and the characteristics of the DC-DC converter.

Current-sensing resistor 40 has been shown as being external to IC 200. In other embodiments, current-sensing resistor 40 may be integrated into IC 200. Connections from the output of DC-DC converter 102 to current-sensing resistor 40 may be made externally with I/O pins, or may be made internally with muxes or select transistors or switches. Likewise, voltage divider resistors 42, 44 could be external or internal. Current-sensing resistor 40 could be in the output current path after transistor 50, but could also sense other related currents, such as by being before transistor 50, or sensing source currents of transistors, or sensing the currents at the return ground of the load.

Components in series may be re-ordered, such as having current-sensing resistor 40 connect to DC-DC converter 102 and then connect to inductor 46 so that inductor 46 is directly connected to load 112, not current-sensing resistor 40. The location of current-sensing resistor 40 could be moved to other locations, such as between the output voltage and the load.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A re-configurable power converter Integrated Circuit (IC) comprising:
   a plurality of channels, each channel having a controller and a DC-DC converter coupled between a channel input and a channel output, and a voltage sense input that indicates an output voltage on an output load driven by current from the channel output;
   wherein the DC-DC converter receives a switch signal that indicates when to drive current from the channel input to the channel output, wherein a duty cycle of the switch signal controls an amount of current driven to the channel output;
   a shared bus that connects to the controller in the plurality of channels, wherein the shared bus connects to all controllers, the shared bus for writing a voltage control target and a current control target into each controller in the plurality of channels;
   wherein the voltage control target and the current control target are multi-bit digital values;
   wherein the controller in each of the plurality of channels comprises:
      a Digital-to-Analog Converter (DAC) to convert the voltage control target to an analog voltage control target;
      a voltage target comparator that compares the analog voltage control target to the voltage sense input to generate a target-compare result;
      a controllable pulse generator that generates the switch signal to the DC-DC converter, the controllable pulse generator adjusting the duty cycle of the switch signal in response to the target-compare result;
   wherein the plurality of channels further comprise a primary channel and a secondary channel;
   wherein the secondary channel further comprises a mux that outputs a selected switch signal as the switch signal to the DC-DC converter in the secondary channel;
   wherein the mux selects the switch signal generated by the controller in the secondary channel as the selected switch signal when operating in a separated mode; and
   wherein the mux selects the switch signal generated by the controller in the primary channel as the selected switch signal when operating in a combined mode.

2. The re-configurable power converter IC of claim 1 wherein the channel output of the primary channel and the channel output of the secondary channel are not connected together during the separated mode,
   wherein one channel drives the output load on the channel output of the primary channel during the separated mode;
   wherein the channel output of the primary channel and the channel output of the secondary channel are connected together during the combined mode,
   wherein two channels drive the output load on the channel output of the primary channel during the combined mode.

3. The re-configurable power converter IC of claim 2 further comprising:
   an external output connection from the channel output of the primary channel to the channel output of the secondary channel;
   wherein the channel output of the primary channel and the channel output of the secondary channel are connected together externally by the external output connection during the combined mode.

4. The re-configurable power converter IC of claim 2 further comprising:
   a second secondary channel;
   a third secondary channel;
   wherein the channel output of the primary channel and the channel output of the secondary channel and the channel output of the second secondary channel and the channel output of the third secondary channel are connected together during the combined mode;
   wherein the controller in the primary channel generates the switch signal that is also applied to the second secondary channel and the third secondary channel during the combined mode;
   wherein four channels drive the output load on the channel output of the primary channel during the combined mode.

5. The re-configurable power converter IC of claim 2 wherein the DC-DC converter further comprises:
   a first transistor having a gate receiving the switch signal and connecting the channel input to the channel output when the switch signal is in a first state.

6. The re-configurable power converter IC of claim 5 wherein the DC-DC converter further comprises:
a second transistor having a gate receiving an inverse of the switch signal and connecting the channel output to a ground when the switch signal is not in the first state;
wherein the DC-DC converter is configured as a Buck converter when an inductor is connected between the channel output and the output load and the channel input is connected to an input voltage supply.

7. The re-configurable power converter IC of claim 5 wherein the DC-DC converter further comprises:
a second transistor having a gate receiving an inverse of the switch signal and connecting the channel input to a ground when the switch signal is not in the first state;
wherein the DC-DC converter is configured as a Boost converter when an inductor is connected between the channel input and an input voltage supply and the channel output is connected to the output load.

8. The re-configurable power converter IC of claim 5 wherein the DC-DC converter further comprises:
a second transistor having a gate receiving an inverse of the switch signal and connecting the channel output to a ground when the switch signal is not in the first state;
an auxiliary channel input, for connecting an inductor between the channel output and the auxiliary channel input;
a third transistor having a gate receiving an inverse of the switch signal and connecting the auxiliary channel input to an auxiliary channel output when the switch signal is not in the first state;
a fourth transistor having a gate receiving the switch signal and connecting the auxiliary channel input to the ground when the switch signal is in the first state;
wherein the output load is driven by the auxiliary channel output;
wherein the DC-DC converter is configured as a Buck-Boost converter when the inductor is connected between the channel output and the auxiliary channel input and the channel input is connected to an input voltage supply.

9. The re-configurable power converter IC of claim 2 wherein the controller for each channel further comprises:
a pair of current sense inputs for connecting across a current-sensing resistor;
a converter for comparing the pair of current sense inputs to generate a current-sense voltage.

10. The re-configurable power converter IC of claim 9 wherein the controller in each of the plurality of channels further comprises:
a second DAC to convert the current control target to an analog current control target;
a current target comparator that compares the analog current control target to the current-sense voltage to further adjust the target-compare result;
wherein the controllable pulse generator adjusts the duty cycle of the switch signal in response to the target-compare result that is adjusted by the voltage target comparator and the current target comparator;
wherein the controller compares voltage and current targets to adjust the duty cycle of the switch signal to the DC-DC converter.

11. The re-configurable power converter IC of claim 10 wherein the controllable pulse generator further comprises:
a sawtooth generator that generates a sawtooth wave;
a threshold comparator that compared sawtooth wave to the target-compare result to generate the switch signal to the DC-DC converter;
wherein when the target-compare result increases, the duty cycle of the switch signal decreases.

12. A flexible array of DC-DC converters comprising:
a plurality of primary channels, wherein a primary channel in the plurality of primary channels comprises:
a first DC-DC converter with a channel input and a channel output connected together by a power transistor that is controlled by a switch-control input for controlling current through the power transistor to the channel output; and
a first controller with a voltage-sense input and a serial-bus input and a switch-control output;
wherein the switch-control output of the controller is applied to the switch-control input of the first DC-DC converter for the primary channel;
a plurality of secondary channels, wherein a secondary channel in the plurality of secondary channels comprises:
a second DC-DC converter with a channel input and a channel output and a switch-control input for controlling current to the channel output;
a second controller with a voltage-sense input and a serial-bus input and a switch-control output; and
a selector that receives the switch-control output of the second controller in the secondary channel, and a switch-control output of the first controller in the primary channel, the selector outputting the switch-control output of the first controller in the primary channel during a combined mode, and outputting the switch-control output of the second controller in the secondary channel during a separated mode;
wherein the switch-control output from the selector is applied to the switch-control input of the second DC-DC converter for the secondary channel; and
a serial bus connected to the first controller in the plurality of primary channels and to the second controller in the plurality of secondary channels, the serial bus allowing a host to write digital values through the serial-bus input into a selected controller including writing a voltage control target into the selected controller;
wherein each controller converts the voltage control target to analog for comparison with the voltage-sense input to adjust a duty cycle of the switch-control output;
wherein the channel output of the second DC-DC converter in the secondary channel is connected to the channel output of the first DC-DC converter in the primary channel during the combined mode, but the channel output of the second DC-DC converter in the secondary channel is isolated from the channel output of the first DC-DC converter in the primary channel during the separated mode.

13. The flexible array of DC-DC converters of claim 12 further comprising:
a current-sensing resistor, in series in a current path with the power transistor of the first DC-DC converter,
a current-sense input generated by the current-sensing resistor;
wherein the serial bus is further for writing a current control target into the selected controller;
wherein each controller converts the current control target to analog for comparison with the current-sense input to adjust the duty cycle of the switch-control output.

14. The flexible array of DC-DC converters of claim 12 further comprising:
a plurality of inductors that comprise an inductor for each primary channel in the combined mode, wherein no inductors are connected only to a secondary channel during the combined mode, and that comprise an inductor for each primary channel and for each secondary channel in the separated mode, for all enabled channels driving loads.

15. The flexible array of DC-DC converters of claim 14 further comprising:
wherein the plurality of inductors comprise the inductor connected to the channel input for a Boost converter configuration, and connected to the channel output for a Buck converter configuration.

16. The flexible array of DC-DC converters of claim 13 wherein each controller further comprises:
a register bank for storing the voltage control target and the current control target;
a first Digital-to-Analog Converter (DAC) to convert the current control target to an analog current control target;
a current target comparator that compares the analog current control target to the current-sense input to generate a target-compare result;
a second DAC to convert the voltage control target to an analog voltage control target;
a voltage target comparator that compares the analog voltage control target to the voltage-sense input to adjust the target-compare result; and
a controllable pulse generator that generates the switch-control input to the DC-DC converter, the controllable pulse generator adjusting the duty cycle of the switch-control output in response to the target-compare result.

17. A multi-configuration DC-DC converter chip comprising:
a plurality of channels, including primary channels and secondary channels, each channel comprising:
a DC-DC converter with a power transistor coupled between a channel input and a channel output, the power transistor having a gate controlled by a switch signal to control an output current to the channel output;
a current-sensing resistor that the output current passes through to generate a first current-sense voltage and a second current-sense voltage;
a controller that receives and stores a current control target from a shared bus, the controller including a digital-analog converter to permit comparing a difference of the first and second current-sense voltage to the current control target to generate a compare result that adjusts a duty cycle of a switch control output;
wherein the switch control output from the controller is applied to the switch signal for the primary channels;
a mux in each of the secondary channels, the mux applying the switch control output from the controller in a secondary channel to the switch signal of the power transistor in the secondary channel during a separated mode, the mux applying the switch control output from the controller in a primary channel to the switch signal of the power transistor in the secondary channel during a combined mode;
wherein the channel output of the primary channel is connected to the channel output of the secondary channel during the combined mode, but isolated from each other during the separated mode;
wherein both the secondary channel and the primary channel drive a combined load during the combined mode, but drive separate loads during the separated mode.

18. The multi-configuration DC-DC converter chip of claim 17 further comprising:
an inductor connected to the channel input for a Boost converter configuration, and connected to the channel output for a Buck converter configuration.

19. The multi-configuration DC-DC converter chip of claim 17 wherein each channel further comprises:
a coupling transistor having a gate controlled by an inverse of the switch signal, for controlling current between a coil input and a final output;
wherein an external inductor is connected between the channel output and the coil input;
wherein the final output drives final output current to a channel load,
wherein the channel is configured as a Buck-Boost converter.

20. The multi-configuration DC-DC converter chip of claim 17 wherein the shared bus comprises an Inter-Integrated Circuit (I2C) bus having a serial clock line and a serial data line for clocking binary data into the controller.

* * * * *